United States Patent [19]

Frechet et al.

[11] Patent Number: 4,801,517
[45] Date of Patent: Jan. 31, 1989

[54] POLYARYLAMINE COMPOUNDS AND SYSTEMS UTILIZING POLYARYLAMINE COMPOUNDS

[75] Inventors: Jean M. J. Frechet, Ithaca, N.Y.; Sylvie Gauthier, Orleans, Canada; William W. Limburg, Penfield, N.Y.; Rafik O. Loutfy; Dasarao K. Murti, both of Ontario, Canada; John W. Spiewak, Webster, N.Y.

[73] Assignee: Xerox Corporation, Stamford, Conn.

[21] Appl. No.: 61,053

[22] Filed: Jun. 10, 1987

[51] Int. Cl.$^4$ ............................ G03G 5/07; G03G 5/14
[52] U.S. Cl. ......................................... 430/59; 430/73; 430/80; 430/96
[58] Field of Search .............................. 430/59, 73, 80

[56] References Cited

U.S. PATENT DOCUMENTS

| | | | |
|---|---|---|---|
| 3,658,520 | 4/1972 | Brantly et al. | |
| 3,779,750 | 12/1973 | Merrill et al. | 430/73 |
| 3,844,781 | 10/1974 | Tsuchiya et al. | |
| 3,890,146 | 6/1975 | Nagashima et al. | 252/501.1 X |
| 4,047,948 | 9/1977 | Horgan | 430/58 |
| 4,052,205 | 10/1977 | Stolka et al. | 430/58 |
| 4,265,990 | 5/1981 | Stolka et al. | 430/58 |
| 4,273,846 | 6/1981 | Pai et al. | 430/59 |
| 4,346,158 | 8/1982 | Pai et al. | 430/59 |
| 4,388,392 | 6/1983 | Kato et al. | 430/58 |
| 4,395,475 | 7/1983 | Noonan et al. | 430/73 X |
| 4,415,641 | 11/1983 | Goto et al. | 430/59 |
| 4,539,282 | 9/1985 | Morimoto et al. | 430/59 |
| 4,551,403 | 11/1985 | Miyakawa et al. | 430/58 |
| 4,587,189 | 5/1986 | Hor et al. | 430/59 |
| 4,588,666 | 5/1986 | Stolka et al. | 430/59 |
| 4,588,667 | 5/1986 | Jones et al. | 430/73 |
| 4,665,000 | 5/1987 | Tokol et al. | 430/59 X |

FOREIGN PATENT DOCUMENTS

| | | | |
|---|---|---|---|
| 626529 | 4/1963 | Belgium | 430/73 |
| 34425 | 5/1984 | European Pat. Off. | |
| 2557398 | 7/1976 | Fed. Rep. of Germany | 430/73 |

OTHER PUBLICATIONS

Photoconductivity and Hole Transport in Polymers of Aromatic Amine-Containing Methacrylates—M. Stolka, D. Pai, D. Renfer, J. Yanus—Journal of Polymer Science: Polymer Chemistry Edition, vol. 21, 969–983 (1983).

*Primary Examiner*—Roland E. Martin

[57] ABSTRACT

An electrostatographic imagining member and an electrophotographic imaging process for using the imaging member are disclosed in which the imaging member comprises a substrate and at least one electroconductive layer, the imaging member comprising a polymeric arylamine compound represented by the formula:

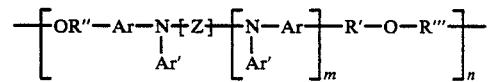

wherein:
n is between about 5 and 5,000,
m is 0 or 1,
Z is selected from certain specified aromatic and fused ring groups,
Ar is selected from certain specified aromatic groups,
R is selected from certain specified alkyl groups,
Ar' is selected from certain specified aromatic groups, and
R' and R" are independently selected from certain specified alkylene groups.

13 Claims, 1 Drawing Sheet

FIG. 1

FIG. 2

POLYARYLAMINE COMPOUNDS AND SYSTEMS UTILIZING POLYARYLAMINE COMPOUNDS

BACKGROUND OF THE INVENTION

This invention relates in general to arylamine compounds and more specifically, to polymeric tertiary arylamine compounds and electrophotographic imaging members and processes utilizing such polymeric tertiary arylamine compounds.

In the art of electrophotography an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles on the surface of the photoconductive insulating layer. The resulting visible toner image can be transferred to a suitable receiving member such as paper. This imaging process may be repeated many times with reusable photoconductive insulating layers.

As more advanced, higher speed electrophotographic copiers, duplicators and printers were developed, degradation of image quality was encountered during cycling. Moreover, complex, highly sophisticated, duplicating and printing systems operating at high speeds have placed stringent requirements including narrow operating limits on photoreceptors. For example, the numerous layers found in many modern photoconductive imaging members must be highly flexible, adhere well to to adjacent layers, and exhibit predictable electrical characteristics within narrow operating limits to provide excellent toner images over many thousands of cycles. There is also a great current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, e.g less than about 0.75 inch (19 mm) diameter, raise the threshold of mechanical performance criteria for photoreceptors to such a high level that spontaneous photoreceptor belt material failure becomes a frequent event for flexible belt photoreceptors.

One type of multilayered photoreceptor that has been employed as a belt in electrophotographic imaging systems comprises a substrate, a conductive layer, a charge blocking layer a charge generating layer, and a charge transport layer. The charge transport layer often comprises an activating small molecule dispersed or dissolved in an polymeric film forming binder. Generally, the polymeric film forming binder in the transport layer is electrically inactive by itself and becomes electrically active when it contains the activating molecule. The expression "electrically active" means that the material is capable of supporting the injection of photogenerated charge carriers from the material in the charge generating layer and is capable of allowing the transport of these charge carriers through the electrically active layer in order to discharge a surface charge on the active layer. The multilayered type of photoreceptor may also comprise additional layers such as an anti-curl backing layer, an adhesive layer, and an overcoating layer. Although excellent toner images may be obtained with multilayered belt photoreceptors that are developed with dry developer powder (toner), it has been found that these same photoreceptors become unstable when employed with liquid development systems. These photoreceptors suffer from cracking, crazing, crystallization of active compounds, phase separation of activating compounds and extraction of activating compounds caused by contact with the organic carrier fluid, isoparaffinic hydrocarbons e.g. Isopar, commonly employed in liquid developer inks which, in turn, markedly degrade the mechanical integrity and electrical properties of the photoreceptor. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]-4,4'-diamine; bis-(4-diethylamino-2-methylphenyl)-phenylmethane; 2,5-bis-(4'-dimethylaminophenyl)-1,3,4,-oxadiazole; 1-phenyl-3-(4'-diethylaminostyryl)-5-(4'-diethylaminophenyl)pyrazoline; 1,1-bis-(4-(di-N,N'-p-methylphenyl)-aminophenyl)cyclohexane; 4-diethylaminobenzaldehyde-1,1-diphenylhydrazone; 1,1-diphenyl-2(p-N,N-diphenyl amino phenyl)-ethylene; N-ethylcarbazole-3-carboxaldehyde-1-methyl-1-phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a $C_{10}$-$C_{14}$ branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure.

The leaching out of the activating small molecule also increases the susceptibility of the transport layer to solvent/stress cracking when the belt is parked over a belt support roller during periods of non-use. Some carrier fluids also promote phase separation of the activating small molecules, such as arylamine compounds and their aforementioned derivatives, in the transport layers, particularly when high concentrations of the arylamine compounds are present in the transport layer binder. Phase separation of activating small molecules also adversely alters the electrical and mechanical properties of a photoreceptor. Although flexing is normally not encountered with rigid, cylindrical, multilayered photoreceptors which utilize charge transport layers containing activating small molecules dispersed or dissolved in a polymeric film forming binder, electrical degradation are similarly encountered during development with liquid developers. Sufficient degradation of these photoreceptors by liquid developers can occur in less than eight hours of use thereby rendering the photoreceptor unsuitable for even low quality xerographic imaging purposes.

Photoreceptors have been developed which comprise charge transfer complexes prepared with polymeric molecules. For example, charge transport complexes formed with polyvinyl carbazole are disclosed in U.S. Pat. Nos. 4,047,948, 4,346,158 and 4,388,392. Photoreceptors utilizing polyvinyl carbazole layers, as compared with current photoreceptor requirements, exhibit relatively poor xerographic performance in both electrical and mechanical properties. Polymeric arylamine molecules prepared from the condensation or di-secondary amine with a di-iodo aryl compound are disclosed in European Patent Publication No. 34,425, published 8/26/81 and issued 5/16/84. Since these polymers are extremely brittle and form films which are very susceptable to physical damage, their use in a flexible belt configuration is precluded. Thus, in advanced imaging systems utilizing multilayered belt photoreceptors exposed to liquid developement systems, cracking and crazing have been encountered in critical charge transport layers during belt cycling. Cracks developing in charge transport layers during cycling can be manifested as print-out defects adversely affecting copy quality. Furthermore, cracks in the photoreceptor pick up toner particles which cannot be removed in the cleaning step and may be transferred to the background in subsequent prints. In addition, crack areas are subject to delamination when contacted with blade cleaning devices thus limiting the options in electrophotograhic product design.

Photoreceptors having charge transport layers containing small molecule arylamine compounds dispersed or dissolved in various resins such as polycarbonates are known in the art. Similarly, photoreceptors utilizing polymeric arylamine containing molecules such as polyvinyl carbazole, polymethacrylates possessing pendant arylamines are also known. Further, condensation polymers of a di-secondary amine with a diiodo aryl compound are described in the prior art.

PRIOR ART STATEMENT

Canadian Pat. No. 1,171,431 (corresponding to European patent application No. 34,425 to Xerox, published 8/26/81, issued 5/16/84)—Condensation polymers of a di-secondary amine with a di-iodo aryl compound are described, for example, in working Examples IX and X.

Stolka et al, Photoconductivity and Hole Transport in Polymers of Aromatic Amine-Containing Methacrylates, Journal of Polymer Science: Polymer Chemistry Edition, Vol. 21, 969 (1983)—Hole transport is described in high molecular weight arylamine-substituted polymethacrylates. Synthesis of the monomers, their polymerization, and the general properties of these polymers are also discussed.

U.S. Pat. No. 4,052,205 to Stolka et al, issued Oct. 4, 1977 —A photoconductive imaging member is disclosed comprising various active polymers, such as poly-N-vinyl carbazole, in a transport layer, e.g line 45, column 5 to line 27, column 6. Derivatives of the active polymers may be hydroxy substituted, e.g. column 5, lines 62-65.

U.S. Pat. No. 4,265,990 to Stolka et al, issued May 5, 1981 —Transport layers are disclosed comprising small molecule arylamines and a polycarbonate resin binder.

U.S. Pat. No. 4,415,641 to Goto et al, issued Nov. 15, 1983 —An electrophotographic light-sensitive element is disclosed comprising a carbazole derivative (see column 3, lines 1-14). $R_2$ can represent a hydroxy group.

U.S. Pat. No. 4,588,666 to Stolka et al, issued May 13, 1986 —A hole transporting molecule is disclosed comprising alkoxy derivatives of tetra phenyl biphenyl diamine (see column 3, lines 33–66). $R_1$ and $R_2$ represent alkoxy groups which include methoxy. Resins such as polyvinyl carbazoles, polycarbonate resins, epoxy resins, polyvinyl butyrals, polyhydroxyether resins may be used as a binder for the hole transporting molecule.

U.S. Pat. No. 4,047,948 to A. M. Horgan, issued Sept. 13, 1977 —A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,346,158 to Pai et al, issued Aug. 24, 1982—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,388,392 to Kato et al, issued June 14, 1987, A photoreceptor is disclosed comprising layers which may contain polyvinyl carbazole. The use of an electron-donative polycyclic aromatic hydrocarbon incorporated in an electron-donative polymeric photoconductor in a charge transporting layer is also disclosed.

U.S. Pat. No. 4,273,846 to Pai et al, issued June 16, 1981 An imaging member is disclosed comprising a polycarbonate resin material and an arylamine (see the general formula, column 2, lines 21-34). Poly-N-vinyl carbazole may be employed in the generator layer.

U.S. Pat. No. 3,844,781 to Tsuchiya et al, issued Oct. 29, 1974 —Various photoconductive materials are disclosed containing substituents such as hydroxyl, amino and alkoxy groups.

U.S. Pat. No. 3,890,146 to Nagashima et al, issued June 17, 1975 —Various photoconductive materials are disclosed containing substituents such as hydroxyl, amino and alkoxy groups.

U.S. Pat. 4,588,667 to Jones, issued May 13, 1986 —Various overcoated electrophotographic imaging members are disclosed including a multilayered imaging member having a substrate, a titanium metal layer, a siloxane blocking layer, an adhesive layer, a charge generating binder layer, and a charge transport layer. The transport layer may contain from about 25 to about 75 percent by weight of arylamine transport material in a resin binder such as polycarbonate resin.

Thus, there is a continuing need for multilayered photoreceptors having improved resistance to cracking, crazing, delamination, softening, swelling, crystallization of active compounds, phase separation of active compounds and leaching of active compounds. In addition to the ink compatibility requirements the active compounds in charge transport layers must also have high resistivity for charge retention, high hole mobility for rapid discharge, and mechanical toughness for long life.

SUMMARY OF THE INVENTION

It is, therefore, an object of the present invention to provide an improved polymeric tertiary arylamine compound and a photoresponsive member containing the polymeric compound which overcome the abovenoted disadvantages.

It is yet another object of the present invention to provide an improved electrophotographic member which exhibits greater resistance to cracking and crazing induced by liquid ink carrier fluid.

It is yet another object of the present invention to provide an improved electrophotographic member which exhibits greater resistance to cracking and crazing when mechanically cycled in a belt-type configuration around a narrow diameter roller.

It is a further object of the present invention to provide a photoconductive imaging member which exhibits improved resistance to component leaching during liquid development.

It is still another object of the present invention to provide a photoconductive imaging member which exhibits improved resistance to component crystallization during liquid development.

It is a further object of the present invention to provide a an electrophotographic imaging member which retains stable electrical properties during cycling.

It is yet another object of the present invention to provide an improved electrophotographic member which resists abrasion when exposed to blade cleaning devices.

It is a further object of the present invention to provide an improved photoconductive imaging member which exhibits resistance to softening and swelling when exposed to liquid ink carrier fluid.

The foregoing objects and others are accomplished in accordance with this invention by providing a polymeric arylamine compound represented by the formula:

wherein:

n is between about 5 and about 5,000,

Z is selected from the group consisting of:

, and —Ar—(X)$_n$—Ar— n is 0 or 1, m is 0 or 1,

Ar is selected from the group consisting of:

, and

-continued

,

R is selected from the group consisting of —CH$_3$, —C$_2$H$_5$, —C$_3$H$_7$, and —C$_4$H$_9$,

Ar' is selected from the group consisting of:

X is selected from the group consisting of:

—CH$_2$—, —C(CH$_3$)$_2$—, —O—, —S—, s is 0, 1 or 2,

R' and R" are independently selected from the group consisting of —CH2—, —CH2CH2—, —CH2CH2CH2—, and —CH2CH2CH2CH2—,

R''' is selected from the group consisting of:

Y is selected from the group consisting of:

—CH$_2$—, —C(CH$_3$)$_2$—, —O—, —S—,

The polymeric arylamine compound of this invention is utilized in an electrophotographic imaging member comprising a substrate having an electrically conductive surface, a charge blocking layer, a charge generation layer, and a hole transport layer, at least the charge generation layer or charge transport layer comprising the above described polymeric arylamine compound of this invention.

The electrophotographic imaging member of this invention may be employed in any suitable electrophotographic imaging process.

Generally, the intermediate for the polymeric arylamine compounds of this invention may be prepared by first reacting an arylamine compound having the represented by the formula:

wherein:

Z, Ar and Ar' are as defined above and m is 0 or 1. Typical compounds represented by this formula include N,N'-diphenylbenzidine, N,N'-diphenyl-p-terphenyl diamine, N,N'-diphenyl-p,p'-diaminodiphenylether, N,N'-diphenyl-p,p'-cyclohexylidene diphenyldiamine, N,N'-diphenyl-p,p'-isopropylidene diphenyldiamine, N,N'-diphenyl-p,p'-methylidene diphenyldiamine, N,N'-diphenyl-p-phenylenediamine, N,N'-diphenyl-m-phenylenediamine, and the like. This arylamine compound is reacted with an iodo benzene compound such as m-bromoiodobenzene, m-chloroiodobenzene, p-chloroiodobenzene, p-bromoiodobenzene, and the like to form an intermediate product represented by the formula:

wherein:

Z, Ar and Ar' are as defined above, Hal is bromine, chlorine or iodine and m is 0 or 1. The bromine atoms in this intermediate product are thereafter are replaced by lithium. The resulting dilithio arylamine compound is reacted with ethylene oxide, formaldehyde, Oxatane, or tetrahydrofuran. This reaction is worked up in the presence of an aqueous acid to form a hydroxy alkylene arylamine precursor represented by the formula:

wherein:

Z, Ar and Ar', and R' are as defined above, and m is 0 or 1. This hydroxy alkylene arylamine precursor is then reacted with phosgene, diphenyl carbonate, bisphenol-A-bis-chloroformate, 4,4'-cyclohexylidene bisphenol-bis-chloroformate, bisphenol-A-bismethylcarbonate or 4,4'-cyclohexylidene bisphenol-bis-methoxy carbonate to form the polymeric arylamine of this invention.

The foregoing reactions are more specifically illustrated by the following reactions:

wherein m is between about 10 and about 10,000.

Another polymeric arylamine of this invention may be prepared by the following illustrative reaction:

wherein m is between about 10 and about 1,000.

Any suitable solvent may be employed to dissolve the reactants. Typical solvents include methylene chloride, chloroform, and the like. Satisfactory yields are achieved with reaction temperatures between about −5° C. and about 30° C. The reaction temperature selected depends to some extent on the specific reactants utilized and is limited by the temperature sensitivity of the polymeric product to crosslinking. The reaction temperature may be maintained by any suitable technique such as heating mantles, radiant heat lamps, and cooling baths (in the case of exothermic reactions), and the like.

The reaction time depends upon the reaction temperatures and reactants used. Thus, less reaction time is required when higher reaction temperatures are employed. Generally, increasing the reaction time increases the degree of polymerization. Satisfactory results have been achieved with reaction times between about 60 minutes to about one day at elevated temperatures and up to four days at room temperature.

One may readily determine whether sufficient reaction product has been formed by following the change in the reaction mixture viscosity. Generally, the solution viscosity will increase rapidly as the polymer molecular weight approaches a maximum. Typical polymeric arylamine compounds of this invention include, for example copoly [3,3'bis(hydroxyethyl)triphenylamine/bisphenolA]carbonate, copoly [3,3'bis(hydroxyethyl)tetraphenylbezidine/bisphenolA]carbonate, poly[3,3'bis(hydroxyethyl)tetraphenylbenzidine]carbonate, poly [3,3'bis(hydroxyethyl)triphenylamine]carbonate, and the like.

Preferred polymeric arylamines of this invention have a molecular weight from about 5,000 to about 1,000,000, more preferably from about 5,000 to about 300,000. The materials most preferred is poly[3,3'bis(hydroxyethyl)tetraphenylbenzidine]carbonate because it forms excellent films, can be cast from common solvents, is organic liquid ink vehicle resistant and exhibits excellent transport of charge carriers (holes)through the electrically active layer.

A photoconductive imaging member of this invention may be prepared by providing a substrate having an electrically conductive surface, applying a charge blocking layer on the electrically conductive surface, applying a charge generation layer on the blocking layer and applying a charge transport layer on the charge generation layer. If desired, the charge transport layer may be applied to the electrically conductive surface and the charge generation layer may thereafter be applied to the charge transport layer. The polymeric arylamine of this invention is present in at least the charge generation layer or the charge transport layer. When the photoconductive imaging member of this invention is employed in liquid development systems, the polymeric arylamine of this invention is preferably present in at least the outermost layer of the imaging member.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like. The electrically insulating or conductive substrate may be rigid or flexible and may have any number of different configurations such as, for example, a cylinder, sheet, a scroll, an endless flexible belt, and the like. Preferably, the substrate is in the form of an endless flexible belt and comprises a commercially available biaxially oriented polyester known as Mylar, available from E.I. du Pont de Nemours & Co. or Melinex available from ICI.

The thickness of the substrate layer depends on numerous factors, including economical considerations, and thus a layer for a flexible belt may be of substantial thickness, for example, over 200 micrometers, or of minimum thickness less than 50 micrometers, provided there are no adverse affects on the final photoconductive device. In one flexible belt embodiment, the thickness of this layer ranges from about 65 micrometers to about 150 micrometers, and preferably from about 75 micrometers to about 125 micrometers for optimum flexibility and minimum stretch when cycled around small diameter rollers, e.g. 12 millimeter diameter rollers. The surface of the substrate layer is preferably cleaned prior to coating to promote greater adhesion of the deposited coating. Cleaning may be effected by exposing the surface of the substrate layer to plasma discharge, ion bombardment and the like.

The conductive layer may vary in thickness over substantially wide ranges depending on the optical transparency and flexibility desired for the electrophotoconductive member. Accordingly, when a flexible photoresponsive imaging device is desired, the thickness of the conductive layer may be between about 20 angstrom units to about 750 angstrom units, and more preferably from about 50 Angstrom units to about 200 angstrom units for an optimum combination of electrical conductivity, flexibility and light transmission. The conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. If desired, an alloy of suitable metals may be deposited. Typical metal alloys may contain two or more metals such as zirconium, niobium, tantalum, vanadium and hafnium, titanium, nickel, stainless steel, chromium, tungsten, molybdenum, and the like, and mixtures thereof. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a conductive carbon black dispersed in a plastic binder as an opaque conductive layer.

After deposition of the metal layer, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be organic or inorganic and may be deposited by any suitable technique. For example, if the blocking layer is soluble in a solvent, it may be applied as a solution and the solvent can subsequently be removed by any conventional method such as by drying. Typical blocking layers include polyvinylbutyral, organosilanes, epoxy resins, polyesters, polyamides, polyurethanes, pyroxyline vinylidene chloride resin, silicone resins, fluorocarbon resins and the like containing an organo metallic salt. Other blocking layer materials include nitrogen containing siloxanes or nitrogen containing titanium compounds such as trimethoxysilyl propylene diamine, hydrolyzed trimethoxysilyl propyl ethylene diamine, N-beta-(aminoethyl) gamma-aminopropyl trimethoxy silane, isopropyl 4-aminobenzene sulfonyl, di(dodecylbenzene sulfonyl) titanate, isopropyl di(4-aminobenzoyl) isostearoyl titanate, isopropyl tri(N-ethylamino-ethylamino) titanate, isopropyl trianthranil titanate, isopropyl tri(N,N-dimethylethylamino)titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. Nos. 4,291,110, 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The oxidized surface inherently forms on the outer surface of most metal ground plane layers when exposed to air after deposition. This combination enhances electrical stability at low RH. The hydrolyzed silane has the general formula:

or mixtures thereof, wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, n is 1,2,3 or 4, and y is 1,2,3, or 4.

The imaging member is preferably prepared by depositing on the metal oxide layer of a metal conductive anode layer, a coating of an aqueous solution of the hydrolyzed aminosilane at a pH between about 4 and about 10, drying the reaction product layer to form a siloxane film and applying an adhesive layer of this invention, and thereafter applying electrically operative layers, such as a photogenerator layer and a hole transport layer, to the siloxane film.

The blocking layer should be continuous and have a thickness of less than about 0.5 micrometer because greater thicknesses may lead to undesirably high residual voltage. A blocking layer of between about 0.005 micrometer and about 0.3 micrometer (50 Angstroms-3000 Angstroms) is preferred because charge neutralization after the exposure step is facilitated and optimum electrical performance is achieved. A thickness of between about 0.03 micrometer and about 0.06 micrometer is preferred for metal oxide layers for optimum electrical behavior. Optimum results are achieved with a siloxane blocking layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. Generally, a weight ratio of blocking layer material and solvent of between about 0.05:100 and about 0.5:100 is satisfactory for spray coating. This siloxane coating is described in U.S. Pat. No. 4,464,450 to L. A. Teuscher, the disclosure of this patent being incorporated herein in its entirety.

If desired, any suitable adhesive layer may be applied to the hole blocking layer. Typical adhesive layers include a polyester resin such as Vitel PE-100, Vitel PE-200, Vitel PE-200D, and Vitel PE-222, all available from Goodyear Tire and Rubber Co., polyvinyl butyral, duPont 49,000 polyester, and the like. When an adhesive layer is employed, it should be continuous and preferably, has a dry thickness between about 200 micrometers and about 900 micrometers and more preferably between about 400 micrometers and about 700 micrometers. Any suitable solvent or solvent mixtures may be employed to form a coating solution of the adhesive layer material. Typical solvents include tetrahydrofuran, toluene, methylene chloride, cyclohexanone, and the like, and mixtures thereof. Generally, to achieve a continuous adhesive layer thickness of about 900 angstroms or less by gravure coating techniques, the solids concentration are between about 2 percent and about 5 percent by weight based on the total weight of the coating mixture of resin and solvent. However, any other suitable and conventional technique may be utilized to mix and thereafter apply the adhesive layer coating mixture to the charge blocking layer. Typical application techniques include spraying, dip coating, roll coating, wire wound rod coating, and the like. Drying of the deposited coating may be effected by any suitable conventional technique such as oven drying, infra red radiation drying, air drying and the like.

Any suitable photogenerating layer may be applied to the blocking layer or intermediate layer if one is employed, which can then be overcoated with a contiguous hole transport layer as described. Examples of photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, quinacridones available from DuPont under the tradename Monastral Red, Monastral violet and Monastral Red Y, Vat orange 1 and Vat orange 3 trade names for dibromo ant anthrone pigments, benzimidazole perylene, substituted 2,4-diamino-triazines disclosed in U.S. Pat. No. 3,442,781, polynuclear aromatic quinones available from Allied Chemical Corporation under the tradename indofast Double Scarlet, Indofast Violet Lake B, Indofast Brilliant Scarlet and Indofast Orange, and the like dispersed in a film forming polymeric binder. Selenium, selenium alloy, benzimidazole perylene, and the like and mixtures thereof may be formed as a continuous, homogeneous photogenerating layer. Benzimidazole perylene compositions are well known and described, for example in U.S. Pat. No. 4,587,189, the entire disclosure thereof being incorporated herein by reference. Multiphotogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layer comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-telluriumarsenic, selenium arsenide, and the like and mixtures thereof are especially preferred because of their sensitivity to while light. Vanadyl hthalocyanine, metal free phthalocyanine and tellurium alloys are also preferred because these materials provide the additional benefit of being sensitive to infra-red light.

Numerous inactive resin materials may be employed in the photogenerating binder layer including those described, for example, in U.S. Pat. No. 3,121,006, the entire disclosure of which is incorporated herein by reference. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, and the like. These polymers may be block, random or alternating copolymers.

Active carrier transporting resin may also be employed as the binder in the photogenerating layer. These resins are particularly useful where the concentration of carrier generating pigment particles is low and the thickness of the carrier generation layer is substantially thicker than about 0.7 micrometer. The active resin commonly used as a binder is polyvinylcarbazole whose function is to transport carriers which would otherwise be trapped in the layer.

The electrically active polymeric amines of this invention can be employed in the generation layer replacing the polyvinylcarbazole binder or any other active or inactive binder.

Part or all of the active resin materials to be employed in the generator layer may be replaced by the electrically active polymeric arylamines of this invention.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition For embodiments in which the photogenerating layers do not contain a resinous binder, the photogenerating layer may comprise any suitable, well known homogeneous photogenerating material. Typical homogeneous photogenerating materials include inorganic photoconductive compounds such as amorphous selenium, selenium alloys selected such as selenium-tellurium, selenium-tellurium-arsenic, and selenium arsenide and organic materials such as vanadyl phthalocyanine, chlorindium phthalocyanine, chloraluminum phthalocyanine, and the like.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer comprises a polymeric aryl amine of this invention capable of supporting the injection of photogenerated holes from the charge generation layer and allowing the transport of these holes through the transport layer to selectively discharge the surface charge. When the photogenerating layer is sandwiched between the conductive layer and the active charge transport layer, the transport layer not only serves to transport holes, but also protects the photoconductive layer from abrasion or chemical attack and therefore extends the operating life of the electrophotographic imaging member. The charge transport layer should exhibit negligible, if any, discharge when exposed to a wavelength of light useful in xerography, e.g. 4000 angstroms to 9000 angstroms. Therefore, the charge transport layer is substantially transparent to radiation in a region in which the photoconductor is to be used. Thus, the active charge transport layer is a substantially non-photoconductive material which supports the injection of photogenerated holes from the generation layer. The active transport layer is normally transparent when exposure is effected through the active layer to ensure that most of the incident radiation is utilized by the underlying charge carrier generator layer for efficient photogeneration. When used with a transparent substrate, imagewise exposure may be accomplished through the substrate with all light passing through the substrate. In this case, the active transport material need not be transmitting in the wavelength region of use. The charge transport layer in conjunction with the generation layer in the instant invention is a material which is an insulator to the extent that an electrostatic charge placed on the transport layer is not conducted in the absence of illumination.

Part or all of the transport material comprising a hole transporting small molecule in an inactive binder to be employed in the transport layer may be replaced by the active materials of this invention described above comprising a polymeric arylamine film forming material. Any substituents in the polymeric arylamine compound should be free from electron withdrawing groups such as NO2 groups, CN groups, and the like. The hole transporting small molecule-inactive resin binder composition may be entirely replaced with 100 percent of a polymeric arylamine compound of this invention.

Any suitable solvent may be employed to apply the transport layer material to the underlying layer. Typical solvents include methylene chloride, toluene, tetrahydrofuran, and the like. Methylene chloride solvent is a particularly desirable component of the charge transport layer coating mixture for adequate dissolving of all the components and for its low boiling point.

An especially preferred transport layer employed in one of the two electrically operative layers in the multilayer photoconductor of this invention comprises from about 50 percent to about 100 percent by weight of poly [3,3'-bis(hydroxyethyl)tetraphenylbenzidene]carbonate and from about 0 percent to about 50 percent by weight of bisphenol-A-polycarbonate.

Any suitable and conventional technique may be utilized to mix and thereafter apply the charge transport layer coating mixture to the underlying surface, e.g. charge generating layer. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the hole transport layer is between about 5 to about 100 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Other layers such as conventional ground strips comprising, for example, conductive particles dispersed in a film forming binder may be applied to one edge of the photoreceptor in contact with the conductive surface, blocking layer, adhesive layer or charge generating layer.

Optionally, an overcoat layer may also be utilized to improve resistance to abrasion. In some cases a back coating may be applied to the side opposite the photoreceptor to provide flatness and/or abrasion resistance. These overcoating and backcoating layers may comprise organic polymers or inorganic polymers that are electrically insulating or slightly semi-conductive.

The electrophotographic member of the present invention containing the electrically active polymeric arylamine in at least the generator or transport layer may be employed in any suitable and conventional electrophotographic imaging process which utilizes charging prior to imagewise exposure to activating electromagnetic radiation. Conventional positive or reversal development techniques may be employed to form a marking material image on the imaging surface of the electrophotograhic imaging member of this invention.

Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner particles of one polarity are attracted to the oppositely charged electrostatic areas of the imaging surface and for reversal development, charged toner particles are attached to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer layer of this invention is sandwiched between a transport layer and a conductive surface, a negative polarity charge is normally applied prior to imagewise exposure to activating electromagnetic radiation.

The electrophotographic member of the present invention exhibits greater resistance to cracking, crazing, crystallization of arylamine compounds, phase separation of arylamine compounds and leaching of arylamine compounds during cycling.

This invention will now be described in detail with respect to the specific preferred embodiments thereof, it being understood that these examples are intended to be illustrative only and that the invention is not intended to be limited to the materials, conditions, process parameters and the like recited herein. All parts and percentages are by weight unless otherwise indicated.

EXAMPLE I

Synthesis of 3,3'-Dibromotriphenylamine.

Aniline (4.0 grams, 43 mmol), 1-bromo-3-iodobenzene (29.2 grams, 103 mmol), powdered anhydrous potassium carbonate (59.4 grams, 429 mmol), electrolytic copper powder (11.0 grams, 173 mmol) and 18-crown-6(2.28 grams, 8.15 mmol) are refluxed in 100 ml of chlorobenzene under nitrogen for about 48 hours, until disappearance of the diphenylamine derivative as verified by TLC. Upon completion of the reaction, the mixture is worked up as described in the synthesis of 3-chlorotriphenylamine. The pure product is also isolated by recrystallization from ethanol.

Yield 8.7 grams, 50%.

EXAMPLE II

Synthesis of 3,3'-Bis(hydroxyethyl)triphenylamine.

The reaction is conducted under argon in dry glassware. n-Butyllithium, 2.5 M solution in hexanes (25.3 ml, 63.3 mmol) is added to 45 ml of toluene in a three-neck flask. This solution is heated to 50° C. in an oil bath. 3,3'-Dibromotriphenylamine (4.25 grams, 10.5 mmol) is dissolved in 45 ml of toluene in an addition funnel. This solution is added slowly to the n-BuLi solution. After the addition is complete, the reaction mixture is left to stir at that temperature (50° C.) for 3 hours; a white precipitate forms. The oil bath is then removed and the flask immersed in a chlorobenzenedry ice bath (−40° C.). Liquid ethylene oxide (about 5 ml, 113 mmol) is added to the mixture, the precipitate dissolves. The solution is left to stir at that temperature for 1 hour; a precipitate appears. The reaction mixture is allowed to reach −15° C. and stirred at that temperature for 1 hour. The solution is then allowed to reach room temperature, in about 1.5 hours, and a few milliliters of water are added.

The reaction mixture is transferred to a separatory funnel with ether and worked up as described in the synthesis of 3-hydroxyethyltriphenylamine. The diol isisolated by HPLC using a 80:20 ethyl acetate: hexanes solution as eluent.

Yield 2.3 grams, 67%.

EXAMPLE III

Preparation of Poly [3,3'-bis(hydroxyethyl triphenylamine]carbonate

A homopolycarbonate was prepared by the reaction of 3,3'-bis(hydroxyethyl)triphenylamine with phosgene gas.

The polymerization is conducted under nitrogen in dry glassware, 3,3'-Bis(hydroxyethyl) triphenylamine 1.45g, 4.34 mmol) is dissolved in about 50 ml of dry pyridine. Phosgene gas is bubbled through the solution. A precipitate forms after about half of the desired amount of phosgene has been retained by the solution. The addition of phosgene is continued until about 0.5 gram (5.0 mmol) has been retained in the solution. The solution is left to stir for 30 minutes, under nitrogen, at room temperature. Nitrogen is then bubbled through for about 1 hour to expel any phosgene left in the solution and the polymerization mixture added dropwise to 4 liters of rapidly stirred water. The solids are filtered, dried, redissolved in THF and the polymer recovered by dropwise addition of the solution to 4 liters of vigourously stirred water.

Yield: 1.25 grams, 80%.

EXAMPLE IV

Synthesis of the Bischloroformate of Bisphenol A.

The reaction is conducted under nitrogen in dry glassware. Phosgene gas (13 grams, 131 mmol) is bubbled through about 100 ml of dichloromethane in a three-neck flask. Bisphenol A (10 grams, 43.8 mmol) is then added to the mixture. In an addition funnel, N,N-dimethylaniline (11 grams, 43 mmol) is diluted with 30 ml of dichloromethane and added slowly to the mixture, at room temperature. The reaction mixture is left to stir overnight.

Nitrogen is bubbled through the mixture for about 30 minutes to expel any phosgene left in the solution. The reaction mixture is washed twice with cold water, twice with a cold 5% hydrochloric acid solution and three times with cold water. The organic layer is dried over magnesium sulfate, filtered and the solvent is evaporated. The pure material is isolated by recrystallization from hexanes.

Yield: 13.1 grams, 85%.

EXAMPLE V

Copoly [3,3'bis(hydroxyethyl)triphenylamine/bisphenolA]carbonate

The polymerization is conducted under argon in dry glassware. In a three-neck flask, 3,3'-bis(hydroxyethyl)-triphenylamine (1.89483 grams, 5.682 mmol) and quinoline (1.76 grams, 13.6 mmol) are dissolved in about 20 ml of dichloromethane. In an addition funnel, bisphenol A bischloroformate (2.00727 grams, 5.683 mmol) is dissolved in about 10 ml of dichloromethane and added slowly to the diol solution, at room temperature. The mixture is refluxed for 4 days. It is then transferred to a separatory funnel, extracted 5 times with a saturated solution of NaCl, dried over magnesium sulfate and concentrated to 50–60 mls. The polymer is recovered by dropwise addition of the solution to 4 liters of vigourously stirred methanol. The solids are filtered, dried, redissolved in dichloromethane and the polymer reprecipitated into methanol.

Yield 1.5 grams, 72%, Tg 96° C.

EXAMPLE VI

Synthesis of 3,3'-Dibromotetraphenylbenzidine.

Diphenylbenzidine (8.00 grams, 23.8 mmol), 1-bromo-3-iodobenzene (20.18 grams, 71.33 mmol), powdered anhydrous potassium carbonate (32.86 grams, 237.8 mmol), electrolytic copper powder (6.04 grams, 95.1 mmol) and 18-crown-6(1.33 grams, 4.75 mmol) are refluxed in 100 ml of chlorobenzene, under nitrogen for about 48 hours, until disappearance of the secondary amine, as verified by TLC. Upon completion of the reaction, the copper and inorganic salts are removed by filtration of the hot reaction mixture. The solvent is evaporated and the pure product isolated by column chromatography, using a 2.5:97.5 ethyl acetate:hexanes solutio as eluent.

Yield: 7.3 grams, 48%.

EXAMPLE VII

Synthesis of 3,3'-Bis(hydroxyethyl)tetraphenylbenzidine.

The reaction is conducted under argon in dry glassware. n-Butyllithium, 2.5 M solution in hexanes (20.4 ml, 51.1 mmol) is added to 50 ml of toluene in a three-neck flask. This solution is heated to 50° C. in an oil bath. 3,3'-Dibromotetraphenylbenzidine (5.50 grams, 8.51 mmol) is dissolved in 50 ml of toluene in an addition funnel and added slowly to the n-BuLi solution. After the addition is complete, the reaction mixture is left to stir at that temperature (50° C.) for 3 hours; a yellow precipite forms. The oil bath is then removed and the flask immersed in a chlorobenzene-dry ice bath (−40° C.). Liquid ethylene oxide (about 3 ml, 68 mmol) is added to the mixture; the precipitate dissolves. The solution is left to stir at that temperature for 1 hour; a precipitate appears. The reaction mixture is allowed to reach −15° C. and stirred at that temperature for 1 hour. The solution is then allowed to reach room temperature in about 1.5 hours and a few milliliters of water are added.

The reaction mixture is transferred to a separatory funnel with ether and extracted 3 times with saturated solution of NaCl. The combined aqueous layers are back extracted twice with ether. The organic fractions are combined and dried over anhydrous potassium carbonate. The solvent is evaporated and the pure diol recovered by HPLC using a 60:40 ethyl acetate:hexanes solution as eluent.

Yield: 3.3 grams, 67%.

EXAMPLE VIII

Poly[3,3'-bis(hydroxyethyl)tetraphenylbenzidine]-carbonate

The polymerization was conducted under nitrogen in dry glassware. 3,3'-Bis(hydroxyethyl)tetraphenylbenzidine (2.50 grams, 4.34 mmol) is dissolved in about 50 ml of dry pyridine. Phosgene gas is bubbled through the solution. A pecipitate forms after about half of the desired amount of phosgene has been retained by the solution. The addition of phosgene is continued until about 0.5 grams 5.0 mmol) has been retained in the solution. The solution is left to stir for 30 minutes, under nitrogen, at room temperature. Nitrogen is then bubbled through for about 1 hour to expel any phosgene left in the solution and the polymerization mixture added dropwise to 4 liters of rapidly stirred water. The solids are filtered, dried, redissolved in THF and the polymer recovered by dropwise addition of the solution of 4 liters of vigourously stirred water.

Yield: 2.2 grams, 84%, Tg 106° C.

EXAMPLE IX

Copoly[3,3'-bis(hydroxyethyl)tetraphenylbenzidine/bisphenol]carbonate

This polymer was prepared by reaction of 3,3'-bis(hydroxyethyl)tetraphenyl benzidine with the bischloroformate of bisphenol A.

The polymerization is conducted under argon in dry glassware. In a three-neck flask, 3,3'-bis(hydroxyethyl)tetraphenyl benzidine (1.99814 grams, 3.464 mmol) and quinoline (1.10 gram, 8.52 mmol) are dissolved in abot 20 ml of dichloromethane. In an addition funnel, bisphenol A bischloroformate (1.22380 grams, 3.477 mmol) is dissolved in about 20 ml of dichloromethane and is added slowly to the diol solution, at room temperature. The mixture is refluxed for 3 days. It is then transferred to a separatory funnel, extracted with water 5 times, dried over magnesium sulfate and the solution concentrated to 50-60 mls. The polymer is isolated by dropwise additions of the polymerization mixture to 4 liters of vigourously stirred methanol. The solids are filtered, dried, redissolved in dichloromethane and the polymer reprecipitated into methanol.

Yield 2.2 grams, 84%, Tg 119° C.

EXAMPLE X

Figure 1:
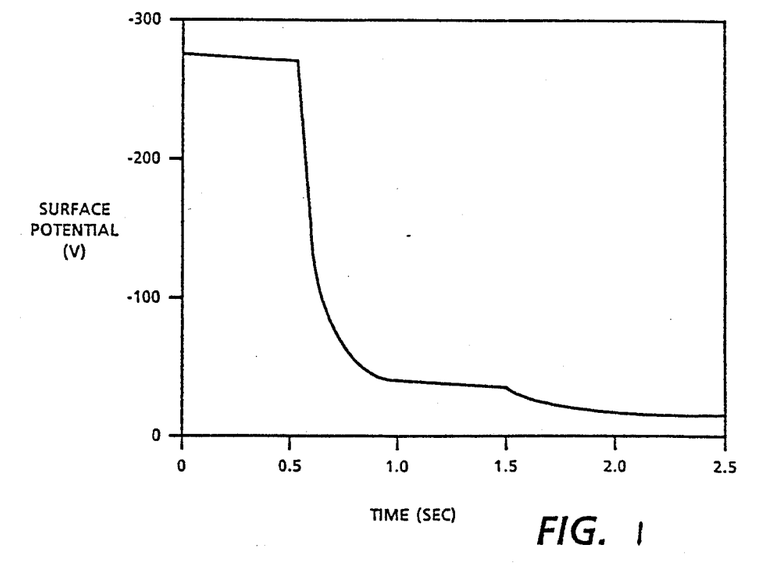

The xerographic electrical properties of poly[3,3'-bis(hydroxyethyl)tetraphenylbenzidene]carbonate obtained by casting a film (nominally 5 micrometers) on a thin evaporated film of amorphous selenium photogenerator (0.5 micrometer on aluminum). The hole transport polymer were cast from a 15% by wt. solid in methylchloride solution using 20 mils gap. The solid films were dried at 135° C. for 20 minutes before mesurements. The dual layer photoreceptor devices were charged negatively and then photodischarged using a monochromatic light of 430 nm or white light 400-700 nm. The devices incorporating poly[3,3'-bis(hydroxyethyl)tetraphenylbenzidene]carbonate exhibited very high charge acceptance, low dark decay, high mobility and very low residuals. The photoinduced discharge curves (PIDC) of the dual layer photoreceptor devices incorporating the novel hole transport poly[3,3'bis(hydroxyethyl)tetraphenylbenzidene]carbonate is shown in FIG. 1.

EXAMPLE XI

Figure 2:
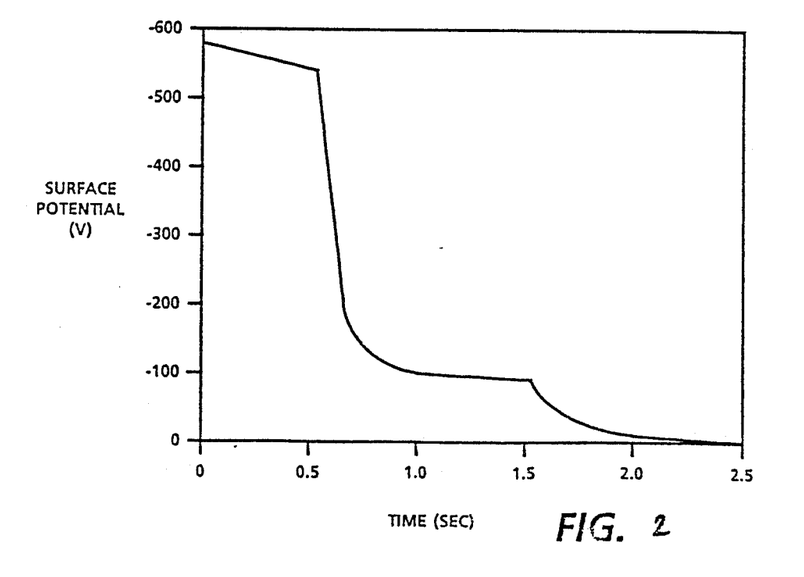

The xerographic electrical properties of copoly[3,3'-bis(hydroxyethyl)tetraphenylbezidene/bisphenol]carbonate obtained by casting a film (nominally 5 micrometers) on a thin evaporated film of amorphous selenium photogenerator (0.5 micrometer on aluminum). The hole transport polymer were cast from a 15% by wt. solid in methylchloride solution using 20 mils gap. The solid films were dried at 135° C. for 20 minutes before measurements. The dual layer photoreceptor devices were charged negatively and then photodischarged using a monochromatic light of 430 nm or white light 400-700 nm. The devices incorporating copoly[3,3'-bis(hydroxyethyl)tetraphenylbezidene/bisphenol]carbonate exhibited very high charge acceptance, low dark decay, high mobility and very low residuals. The photoinduced discharge curves (PIDC) of the dual layer photoreceptor devices incorporating the novel hole transport copoly[3,3'-bis(hydroxyethyl)tetraphenylbezidene/bisphenol]carbonate is shown in FIG. 2.

Although the invention has been described with reference to specific preferred embodiments, it is not intended to be limited thereto, rather those skilled in the art will recognize that variations and modifications may be made therein which are within the spirit of the invention and within the scope of the claims.

We claim:

1. An electrostatographic imaging member comprising a support layer, a charge generating layer and a charge transport layer, said charge transport layer comprising an arylamine compound represented by the formula:

wherein:

n is between about 5 and about 5,000, m is 0 or 1,

Z is selected from the group consisting of:

, and —Ar—(X)$_n$—Ar— n is 0 or 1,

Ar is selected from the group consisting of:

, and

R is selected from the group consisting of —CH$_3$, —C$_2$H$_5$, —C$_3$H$_7$, and —C$_4$H$_9$,

Ar' is selected from the group consisting of:

X is selected from the group consisting of:

s is 0, 1 or 2,

R' and R" are independently selected from the group consisting of —CH$_2$—, —CH$_2$CH$_2$—, —CH$_2$CH$_2$CH$_2$—, and —CH$_2$CH$_2$CH$_2$CH$_2$—, R''' is selected from the group consisting of:

and

Y is selected from the group consisting of:

said arylamine compound being substantially non-photoconductive when exposed to radiation having a wavelength between about 4,000 angstroms and about 9,000 angstroms, capable of supporting the injection of photogenerated holes and capable of supporting the transport of said holes.

2. An electrostatographic imaging member according to claim 1 wherein said charge transport layer is sandwiched between said support layer and said charge generating layer.

3. An electrostatographic imaging member according to claim 1 wherein said charge generating layer is sandwiched between said support layer and said charge transport layer.

4. An electrostatographic imaging member comprising a support layer and at least one electrophotoconductive layer, said imaging member comprising a charge generating material and an arylamine compound represented by the formula:

wherein:

n is between about 5 and about 5,000, m is 0 or 1,

Z is selected from the group consisting of:

n is 0 or 1,

Ar is selected from the group consisting of:

R is selected from the group consisting of —CH$_3$, —C$_2$H$_5$, —C$_3$H$_7$, and —C$_4$H$_9$,

Ar' is selected from the group consisting of:

X is selected from the group consisting of:

—CH$_2$—, —C(CH$_3$)$_2$—, —O—, —S—,

-continued s is 0, 1 or 2,
R' and R" are independently selected from the group consisting of —CH₂—, —CH₂CH₂—, —CH₂CH₂CH₂—, and —CH₂CH₂CH₂CH₂—,
R''' is selected from the group consisting of:

Y is selected from the group consisting of:

said arylamine compound being substantially non-photoconductive when exposed to radiation having a wavelength between about 4,000 angstroms and about 9,000 angstroms, capable of supporting the injection of photogenerated holes and capable of supporting the transport of said holes.

5. An electrostatographic imaging member according to claim 4 wherein said imaging member comprises a charge generating layer and a charge transport layer and wherein said electrophotoconductive layer is said charge generating layer.

6. An electrostatographic imaging member according to claim 5 wherein said charge generating layer comprises photogenerating pigment particles dispersed in a binder comprising said arylamine compound.

7. An electrostatographic imaging member according to claim 4 wherein said imaging member comprises a protective overcoating comprising said arylamine compound.

8. An electrophotographic imaging process comprising forming an electrostatic latent image on the imaging surface of an electrostatographic imaging member comprising a support layer and at least one electrophotoconductive layer, said imaging member comprising a charge generating material and an arylamine compound represented by the formula:

wherein:
n is between about 5 and about 5,000,
m is 0 or 1,
Z is selected from the group consisting of:

n is 0 or 1,
Ar is selected from the group consisting of:

R is selected from the group consisting of —CH₃, —C₂H₅, —C₃H₇, and —C₄H₉,
Ar' is selected from the group consisting of:

X is selected from the group consisting of:

s is 0, 1 or 2,

R' and R" are independently selected from the group consisting of —CH₂—, —CH₂CH₂—, —CH₂CH₂CH₂—, and —CH₂CH₂CH₂CH₂—,

R''' is selected from the group consisting of:

Y is selected from the group consisting of:

said arylamine compound being substantially non-photoconductive when exposed to radiation having a wavelength between about 4,000 angstroms and about 9,000 angstroms, capable of supporting the injection of photogenerated holes and capable of supporting the transport of said holes, and contacting said imaging member with a developer to deposit toner marking particles on said imaging surface to form a marking particle image in conformance to said electrostatic latent image.

9. An electrophotographic imaging process according to claim 8 wherein said developer is a liquid developer.

10. An electrophotographic imaging process according to claim 9 wherein said liquid developer comprises an organic carrier fluid.

11. An electrophotographic imaging process according to claim 9 including transfering said marking particle image to a receiving member.

12. An electrophotographic imaging process according to claim 11 including repeating said forming, contacting and transfering steps at least once.

13. An electrophotographic imaging process according to claim 8 wherein said imaging member comprises a charge generating layer and a charge transport layer comprising said arylamine compound, said charge transport layer being substantially transparent to radiation in the region in which said imaging member is exposed during electrophotographic imaging and capable of supporting the injection of photo-generated holes from said charge generating layer and transporting said holes through said charge transport layer to selectively discharge an electrostatic charge on said imaging surface to form said electrostatic latent image.

* * * * *